United States Patent
Chen

(10) Patent No.: US 11,166,358 B2
(45) Date of Patent: Nov. 2, 2021

(54) VOLTAGE SETTING VALUE ADJUSTING DEVICE AND CIRCUIT THEREOF

(71) Applicant: Qisda Corporation, Taoyuan (TW)

(72) Inventor: Chuan-Chu Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/926,840

(22) Filed: Jul. 13, 2020

(65) Prior Publication Data

US 2021/0045219 A1 Feb. 11, 2021

(30) Foreign Application Priority Data

Aug. 6, 2019 (CN) .......................... 201910720077.9

(51) Int. Cl.
*H05B 47/14* (2020.01)
*G03B 21/20* (2006.01)
*H02M 3/156* (2006.01)
*H05B 45/14* (2020.01)

(52) U.S. Cl.
CPC .......... *H05B 47/14* (2020.01); *G03B 21/2033* (2013.01); *H02M 3/156* (2013.01); *H05B 45/14* (2020.01)

(58) Field of Classification Search
CPC ........ H05B 47/14; H05B 45/14; H05B 45/34; G03B 21/2033; H02M 3/156; H04N 9/3161; H04N 9/3155
See application file for complete search history.

(56) References Cited

U.S. PATENT DOCUMENTS

| 2009/0072755 | A1* | 3/2009 | Prexl | H05B 45/375 315/291 |
| 2010/0176748 | A1* | 7/2010 | Murata | H04B 10/801 315/307 |
| 2012/0050696 | A1* | 3/2012 | Yanase | G03B 33/12 353/85 |
| 2012/0126766 | A1* | 5/2012 | Chen | H02M 3/156 323/283 |
| 2013/0200812 | A1* | 8/2013 | Radermacher | H05B 45/44 315/186 |
| 2013/0301013 | A1* | 11/2013 | Samejima | G02B 19/0028 353/52 |
| 2017/0347414 | A1* | 11/2017 | Harada | H05B 45/10 |

* cited by examiner

*Primary Examiner* — Daniel D Chang

(57) ABSTRACT

A voltage setting value adjusting device includes a controller, a plurality of laser light sources and a voltage setting value adjusting circuit. The controller has a voltage setting value input end and a driving voltage output end. The laser light sources are coupled to the driving voltage output end, and the controller outputs a driving current to the laser light sources according to a voltage setting value. The voltage setting value adjusting circuit is coupled between the voltage setting value input end and the driving voltage output end to detect a driving voltage of the laser light sources and adjust the voltage setting value according to the driving voltage.

14 Claims, 1 Drawing Sheet

VOLTAGE SETTING VALUE ADJUSTING DEVICE AND CIRCUIT THEREOF

This application claims the benefit of People's Republic of China application Serial No. 201910720077.9, filed Aug. 6, 2019, the subject matter of which is incorporated herein by reference.

BACKGROUND OF THE INVENTION

Field of the Invention

The invention relates in general to an adjusting device, and more particularly to a voltage setting value adjusting device and a circuit thereof.

Description of the Related Art

Along with the development in the electronic technology, projectors have been widely used in various fields such as education, business and household. Based on the operation principles, the projectors can be divided into cathode ray tube (CRT) projectors, liquid crystal display (LCD) projectors and digital light processing (DLP) projectors. High-brightness projector mainly uses high-power laser light source. If the optical power outputted from the laser light source is too large, the optical power will cause damage to the internal elements of the projector such as lens and fluorescent color wheel. Therefore, the optical power needs to be limited.

SUMMARY OF THE INVENTION

The invention is directed to a voltage setting value adjusting device and a circuit thereof capable of detecting a driving voltage of the laser light sources and adjusting the voltage setting value according to the driving voltage.

According to one embodiment of the present invention, a voltage setting value adjusting device, including a controller, a plurality of laser light sources and a voltage setting value adjusting circuit, is provided. The controller has a voltage setting value input end and a driving voltage output end. The laser light sources are coupled to the driving voltage output end, and the controller outputs a driving current to the laser light sources according to a voltage setting value. The voltage setting value adjusting circuit is coupled between the voltage setting value input end and the driving voltage output end to detect a driving voltage of the laser light sources and adjust the voltage setting value according to the driving voltage.

According to another embodiment of the present invention, a voltage setting value adjusting circuit used in a laser light source is provided. The laser light source is coupled to a controller having a voltage setting value input end and a driving voltage output end. The controller outputs a driving current to the laser light sources according to a voltage setting value. The voltage setting value adjusting circuit is coupled between the voltage setting value input end and the driving voltage output end to detect a driving voltage of the laser light sources and adjust the voltage setting value according to the driving voltage.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, a voltage setting value adjusting device and a circuit thereof configured to detect a driving voltage of the laser light sources and adjust the voltage setting value according to the driving voltage are provided.

Figure 1:
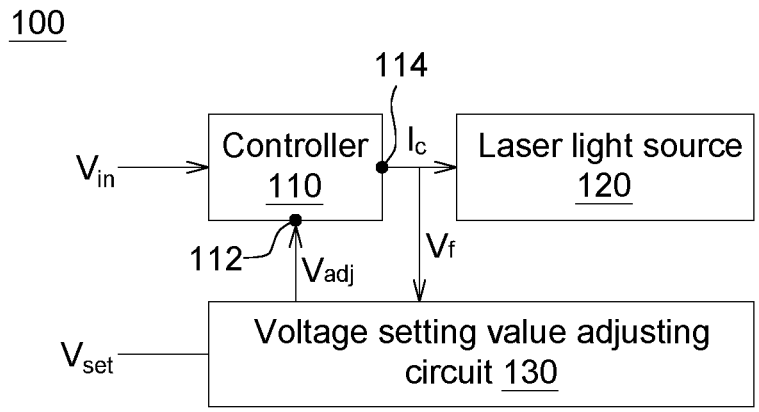
FIG. 1 is a schematic diagram of a voltage setting value adjusting device according to an embodiment of the present invention.

FIG. 1 is a schematic diagram of a voltage setting value adjusting device 100 according to the present invention an embodiment. Refer to FIG. 1, the voltage setting value adjusting device 100 includes a controller 110, a plurality of laser light sources 120 and a voltage setting value adjusting circuit 130. The output light color of the laser light sources 120 can be changed by an optical element, such as color wheel, lens and/or prism, which deflects the color light to another optical path.

The controller 110 has a voltage setting value input end 112 and a driving voltage output end 114. The voltage setting value $V_{set}$ can be a voltage signal pre-determined by a central processor. When the voltage setting value $V_{set}$ changes, the driving current $I_c$ received by the laser light sources 120 varies with the voltage setting value $V_{set}$ and further changes the optical power outputted from the laser light sources 120. That is, when the voltage setting value $V_{set}$ changes, the controller 110 can output a driving current $I_C$ to the laser light sources 120 according to the voltage setting value Vset. Under normal circumstances, the voltage setting value $V_{set}$ is a constant value, such that the driving current $I_C$ can remain at a constant current.

Besides, the controller 110 is configured to receive an input voltage $V_{in}$ from a power supplier. The input voltage $V_{in}$ can be coupled to the controller 110 through a boost converter or a buck converter, which converts the input voltage $V_{in}$ into a driving voltage $V_f$ (terminal voltage) required by the laser light sources 120. That is, a plurality of laser light sources 120 can be coupled to the driving voltage output end 114 of the controller 110 to receive a driving current $I_c$.

In an embodiment, when a plurality of laser light sources 120 are connected in series, the driving voltage $V_f$ required by the laser light sources 120 is relatively higher, such as in a range of 50V-100V, and the input voltage $V_{in}$ can be boosted by the boost converter. Conversely, when a plurality of laser light sources 120 are connected in parallel, the driving voltage $V_f$ required by the laser light sources 120 is relatively lower, and the input voltage $V_{in}$ can be bucked by the buck converter. The laser light sources 120 can be connected either in series or in parallel; or, some of the laser light sources 120 are connected in series first and then are connected in parallel with the remaining laser light sources 120; or, some of the laser light sources 120 are connected in parallel first and then are connected in series with the remaining laser light sources 120, and the present invention does not have particular restriction regarding the said connection arrangements.

In an exemplary example, the driving voltage $V_f$ of the laser light sources 120 is relevant with the temperature of the laser light sources 120. When the laser light sources 120 are just activated, the temperature of the laser light sources 120 is lower, and the driving voltage $V_f$ of the laser light sources 120 increases. After the laser light sources 120 are activated for a period of time (such as 5 minutes), the temperature of the laser light sources 120 increases, and the driving voltage $V_f$ of the laser light sources 120 can resume to a normal level. That is, as the temperature of the laser light sources 120 changes, the driving voltage $V_f$ required by the laser diodes in the laser light sources 120 also changes, and the optical power outputted from the laser light sources 120 varies with the driving voltage $V_f$. It should be noted that when the laser light sources 120 are just activated, the laser light sources 120 has a higher driving voltage $V_f$. Meanwhile, if the driving current $I_c$ of the laser light sources 120 still remains at a constant current, the output of the optical power may be too large and burn other elements. Therefore, when the laser light sources 120 has a higher driving voltage $V_f$, the driving current $I_c$ of the laser light sources 120 needs to be suitably adjusted to avoid the output of the optical power becoming too large and burning other elements.

As disclosed above, the present invention provides a voltage setting value adjusting circuit 130 configured to detect a driving voltage $V_f$ of the laser light sources 120 and adjust the voltage setting value $V_{set}$ according to the driving voltage $V_f$, such that the controller 110 can output a driving current $I_c$ to the laser light sources 120 according to the adjusted voltage setting value $V_{adj}$.

Figure 2:
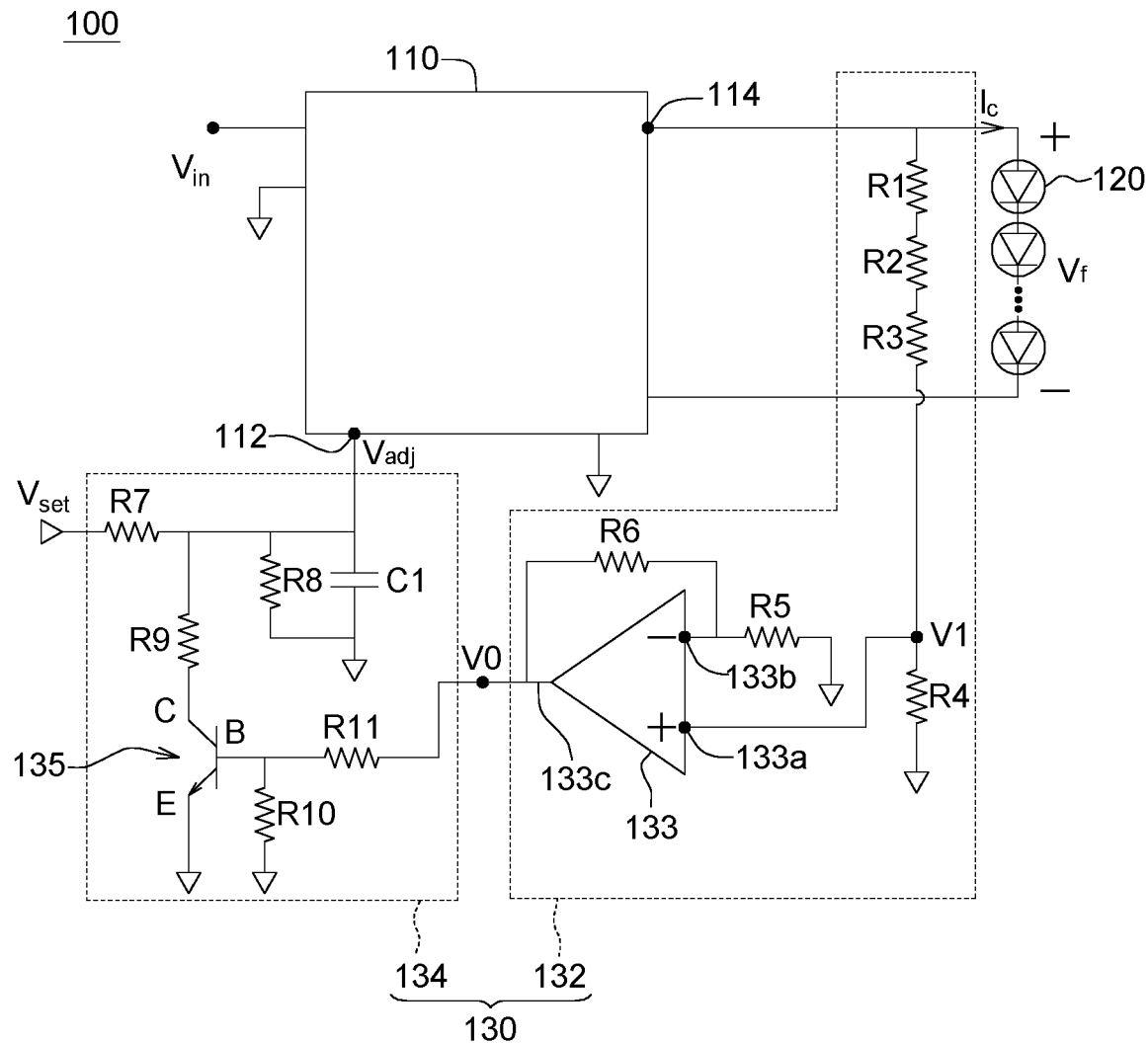
FIG. 2 is a schematic of a circuit of a voltage setting value adjusting device according to an embodiment of the present invention.

FIG. 2 is a schematic of a circuit of a voltage setting value adjusting device 100 according to an embodiment of the present invention. Referring to FIG. 2, a voltage setting value adjusting circuit 130 is coupled between a voltage setting value input end 112 and a driving voltage output end 114 of the controller 110.

The voltage setting value adjusting circuit 130 includes a voltage detecting circuit 132 and a switch circuit 134, wherein one end of the voltage detecting circuit 132 is coupled to the driving voltage output end 114, and the other end of the voltage detecting circuit 132 is coupled to the switch circuit 134. The voltage detecting circuit 130 is configured to output a judgement voltage corresponding to the driving voltage $V_f$. When the judgement voltage is larger than a reference voltage, the switch circuit 134 is conducted. Conversely, when the judgement voltage is less than the reference voltage, the switch circuit 134 is not conducted (is turned off). In an embodiment, the voltage detecting circuit 132 can detect the driving voltage $V_f$ of the laser light sources 120 by any method, and the implementation of the voltage detecting circuit 132 is not limited to the exemplifications below.

Refer to FIG. 2. The voltage detecting circuit 132 includes a non-inverting amplifier 133 having a non-inverting input end 133a, an inverting input end 133b and an output end 133c. The non-inverting input end 133a is grounded through a first resistance R4 and is coupled to the driving voltage output end 114 through second resistances R1-R3. The inverting input end 133b is grounded through a third resistance R5 and is coupled to the output end 133c through a fourth resistance R6.

As indicated in FIG. 2, the input voltage V1 of the non-inverting input end 133a is the product of the current flowing through the first resistance R4 and the first resistance R4; the driving voltage $V_f$ is the product of the current flowing through the first resistance R4 and the second resistances R1-R3 and the sum of the first resistance R4 and the second resistances R1-R3. That is, the input voltage V1 of the non-inverting input end 133a can be expressed as V1=$V_f$×R4/(R1+R2+R3+R4).

The input impedance of the non-inverting amplifier 133 is infinite, therefore the voltage of the inverting input end 133b is equivalent to the input voltage V1 of the non-inverting input end 133a. Meanwhile, the voltage of the inverting input end 33b is the product of the current flowing through the third resistance R5 and the third resistance R5; the voltage of the output end 133c is the product of the current flowing through the third resistance R5 and the fourth resistance R6 and the sum of the third resistance R5 and the fourth resistance R6. That is, voltage V0 of the output end 133c can be expressed as: voltage V0=V1×(1+R6/R5).

As disclosed above, when the laser light sources 120 are just activated, the temperature of the laser light sources 120 is lower, the driving voltage $V_f$ of the laser light sources 120 is large, and both the input voltage V1 of the inverting input end 133b and the voltage V0 of the output end 133c increase relatively. Conversely, after the laser light sources 120 is activated for a period of time, the temperature of the laser light sources 120 increases, the driving voltage $V_f$ of the laser light sources 120 is small, and both the input voltage V1 of the inverting input end 133b and the voltage V0 of the output end 133c decrease relatively. In the present embodiment, the voltage V0 of the output end 133c can be larger than or less than a reference voltage according to the driving voltage $V_f$ of the laser light sources 120 to conduct or dis-conduct the switch circuit 134.

In the present embodiment, the switch circuit 134 is configured to selectively cause the voltage setting value $V_{set}$ to be a first voltage or a second voltage according to the voltage V0 of the output end 133c (that is, judgement voltage). The switch circuit 134 can adjust the voltage setting value $V_{set}$ by any method, and the implementation of the switch circuit 134 is not limited to the exemplifications below.

Refer to FIG. 2. The switch circuit 134 includes a transistor 135 having an emitter E, a base B and a collector C. The emitter E is grounded; the base B is grounded through a resistance R10 and is coupled to the output end 133c of the non-inverting amplifier 133 through another resistance R11; and the collector C is coupled to the voltage setting value input end 112 through a variable voltage divider. The variable voltage divider is formed of a series resistance R7, two resistances R8 and R9 connected in parallel, and a capacitor C1. The variable voltage divider is configured to change the voltage $V_{adj}$ of the voltage setting value input end 112.

As indicated in FIG. 2, there is a threshold voltage, such as 0.7V, between the base B and the emitter E of the transistor 135. When the voltage V0 of the output end 133c of the non-inverting amplifier 133 (that is, judgement voltage) is larger than the threshold voltage, the emitter E and the collector C of the transistor 135 both are conducted to generate a conducting current. Meanwhile, the two resistances R8 and R9 connected in parallel have a smaller resistance. Furthermore, after the voltage setting value $V_{set}$ is divided, the voltage $V_{adj}$ decreases and makes the adjusted voltage $V_{adj}$ (that is, first voltage) relatively smaller.

Also, when the voltage V0 of the output end 133c of the non-inverting amplifier 133 (that is, judgement voltage) is less than the threshold voltage, the emitter E and the collector C of the transistor 135 are not conducted. Meanwhile, the two resistances R8 and R9 cannot be connected in parallel, the resistances R7 and R8 connected in series have a larger resistance. Furthermore, after the voltage setting value $V_{set}$ is divided, the voltage $V_{adj}$ increases and makes the adjusted voltage $V_{adj}$ (that is, second voltage) relatively larger.

Therefore, even when the voltage setting value $V_{set}$ is a constant value, in the present embodiment, the voltage setting value adjusting circuit 130 can adjust the voltage setting value $V_{set}$ according to the driving voltage $V_f$ to change the voltage of the voltage setting value input end 112.

It can be understood from the above disclosure that when the laser light sources 120 are just activated, the temperature of the laser light sources 120 is lower and the driving voltage $V_f$ of the laser light sources 120 is large. Meanwhile, by adjusting the voltage setting value $V_{set}$, the driving current $I_c$ of the laser light sources 120 becomes smaller and the optical power outputted from the laser light sources 120 can be limited. Conversely, after the laser light sources 120 is activated for a period of time, the temperature of the laser light sources 120 increases, and the driving voltage $V_f$ of the laser light sources 120 becomes smaller. Meanwhile, by adjusting the voltage setting value $V_{set}$, the driving current $I_c$ of the laser light sources 120 becomes larger (or resumes to the original setting value), and the optical power outputted from the laser light sources 120 increases.

The voltage setting value adjusting device 100 and the circuit thereof disclosed in above embodiments of the present invention can be used in projection devices whose light source is laser light source or other high energy light sources. When the driving voltage of the laser light sources is large, the voltage setting value adjusting device 100 and the circuit thereof can suitably adjust the driving current of the laser light sources of the present invention to avoid the outputted optical power being too large and burning other elements. Meanwhile, when the driving voltage of the laser light sources resumes to a normal level, the driving current of the laser light sources can be adjusted to the original setting value to increase the optical power outputted from the laser light sources.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A voltage setting value adjusting device, comprising:
   a controller having a voltage setting value input end and a driving voltage output end;
   a plurality of laser light sources coupled to the driving voltage output end, wherein the controller outputs a driving current to the laser light sources according to a voltage setting value; and
   a voltage setting value adjusting circuit coupled between the voltage setting value input end and the driving voltage output end to detect a driving voltage of the laser light sources and adjust the voltage setting value according to the driving voltage, wherein the voltage setting value adjusting circuit comprises:
   a voltage detecting circuit configured to detect the driving voltage; and
   a switch circuit configured to selectively cause the voltage setting value to be a first voltage or a second voltage according to a judgement voltage corresponding to the driving voltage,
   wherein the voltage detecting circuit comprises a non-inverting amplifier having a non-inverting input end, an inverting input end and an output end; the non-inverting input end is grounded through a first resistance and is coupled to the driving voltage output end through a second resistance, the inverting input end is grounded through a third resistance, and the output end is coupled to the inverting input end through a fourth resistance.

2. The device according to claim 1, wherein when the driving voltage increases, the driving current decreases relatively.

3. The device according to claim 1, wherein when the driving voltage decreases, the driving current increases relatively.

4. The device according to claim 1, wherein the laser light sources are connected in series.

5. The device according to claim 1, wherein the laser light sources are connected in parallel.

6. The device according to claim 1, wherein the switch circuit further comprises a transistor having an emitter, a base and a collector; the emitter is grounded, the base is coupled to the output end of the non-inverting amplifier, and the collector is coupled to the voltage setting value input end through a variable voltage divider.

7. The device according to claim 6, wherein when the judgement voltage of the output end of the non-inverting amplifier is larger than a threshold voltage of the transistor, the emitter and the collector are conducted; and when a voltage of the output end of the non-inverting amplifier is less than the threshold voltage of the transistor, the emitter and the collector are not conducted.

8. A voltage setting value adjusting circuit used in a laser light source, wherein the laser light source is coupled to a controller having a voltage setting value input end and a driving voltage output end, and the controller outputs a driving current to the laser light source according to a voltage setting value,
   wherein, the voltage setting value adjusting circuit is coupled between the voltage setting value input end and the driving voltage output end to detect a driving voltage of the laser light source and adjust the voltage setting value according to the driving voltage, the voltage setting value adjusting circuit comprises:
   a voltage detecting circuit configured to detect the driving voltage; and
   a switch circuit configured to selectively cause the voltage setting value to be a first voltage or a second voltage according to a judgement voltage corresponding to the driving voltage,
   wherein the voltage detecting circuit comprises a non-inverting amplifier having a non-inverting input end, an inverting input end and an output end; the non-inverting input end is grounded through a first resistance and is coupled to the driving voltage output end through a second resistance, the inverting input end is grounded through a third resistance, and the output end is coupled to the inverting input end through a fourth resistance.

9. The circuit according to claim 8, wherein when the driving voltage increases, the driving current decreases relatively.

10. The circuit according to claim 8, wherein when the driving voltage decreases, the driving current increases relatively.

11. The circuit according to claim 8, wherein a plurality of the laser light source is connected in series.

12. The circuit according to claim 8, wherein a plurality of the laser light source is connected in parallel.

13. The circuit according to claim 8, wherein the switch circuit further comprises a transistor switch circuit having an emitter, a base and a collector; the emitter is grounded, the base is coupled to the output end of the non-inverting amplifier, and the collector is coupled to the voltage setting value input end through a variable voltage divider.

14. The circuit according to claim 13, wherein when the judgement voltage of the output end of the non-inverting amplifier is larger than a threshold voltage of the transistor switch circuit, the emitter and the collector are conducted; and when a voltage of the output end of the non-inverting amplifier is less than the threshold voltage of the transistor switch circuit, the emitter and the collector are not conducted.

* * * * *